United States Patent
Schoenfeld et al.

(10) Patent No.: US 10,941,901 B2
(45) Date of Patent: Mar. 9, 2021

(54) LUBRICANT APPLICATOR

(71) Applicant: SKF Lubrication Systems Germany GmbH, Walldorf (DE)

(72) Inventors: Andreas Schoenfeld, Sankt Leon-Rot (DE); Daniel Beisel, Kronau (DE); Juergen Kreutzkaemper, Waibstadt-Daisbach (DE); Thomas Leibbrand, Rauenberg (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 263 days.

(21) Appl. No.: 15/830,959

(22) Filed: Dec. 4, 2017

(65) Prior Publication Data
US 2018/0163921 A1    Jun. 14, 2018

(30) Foreign Application Priority Data

Dec. 12, 2016   (DE) .......................... 102016224679.8

(51) Int. Cl.
*F16N 7/22*     (2006.01)
*F16H 57/04*    (2010.01)
(Continued)

(52) U.S. Cl.
CPC ............ *F16N 7/22* (2013.01); *F16C 33/6659* (2013.01); *F16H 57/0431* (2013.01);
(Continued)

(58) Field of Classification Search
CPC .. F16H 57/0431; F16H 57/0495; F03D 80/70; Y10T 74/19995; Y02E 10/722
(Continued)

(56) References Cited

U.S. PATENT DOCUMENTS 2,590,134 A * 3/1952 Slonneger ................. F02D 9/02
                                                       123/195 R
2,784,808 A * 3/1957 Thomas .................. F16N 13/10
                                                         184/27.1
(Continued)

FOREIGN PATENT DOCUMENTS

CN        103388673 A     11/2013
CN        203641821 U      6/2014
(Continued)

OTHER PUBLICATIONS

Office Action and Search Report from the Chinese Patent Office dispatched Apr. 28, 2020 in related Chinese application No. 201711064509.2, and translation thereof.

*Primary Examiner* — Henry Y Liu
(74) *Attorney, Agent, or Firm* — J-Tek Law PLLC; Scott T. Wakeman; Mark A. Ussai

(57) ABSTRACT

A lubricant application device includes a base body configured to be mounted to an end surface of a gear. The base body includes a port configured to be connected to a source of lubricant and a holder for holding a lubricant applicator supported by the base body. A lubricant passage connects the port to the holder, and a lubricant applicator is mounted in the holder. The lubricant applicator is a coiled wire defining an internal passage for carrying the lubricant and may include a first length of coils with no axial spacing and a second length of coils that are axial spaced.

19 Claims, 3 Drawing Sheets

(51) Int. Cl.
*F16C 33/66* (2006.01)
*F16N 11/08* (2006.01)
*F03D 80/70* (2016.01)
*F04D 29/056* (2006.01)
*F16C 19/06* (2006.01)

(52) U.S. Cl.
CPC .............. *F16N 11/08* (2013.01); *F03D 80/70* (2016.05); *F04D 29/056* (2013.01); *F05B 2260/4031* (2013.01); *F05B 2260/98* (2013.01); *F16C 19/06* (2013.01); *F16H 57/0401* (2013.01); *F16N 2210/025* (2013.01)

(58) Field of Classification Search
USPC .................................................. 184/14, 6.12
See application file for complete search history.

(56) References Cited

U.S. PATENT DOCUMENTS

| | | | | |
|---|---|---|---|---|
| 2,893,789 | A * | 7/1959 | Heinz | F16C 29/02 384/13 |
| 3,424,022 | A * | 1/1969 | Greenberg | F16H 57/0431 74/409 |
| 3,822,607 | A * | 7/1974 | Tharaldsen | F16H 57/0431 74/468 |
| 4,695,088 | A | 9/1987 | Jensen | |
| 5,086,878 | A | 2/1992 | Swift | |
| 5,622,239 | A * | 4/1997 | Orlitzky | F16H 57/0463 184/39 |
| 7,244,097 | B2 * | 7/2007 | Hinz | F03D 7/0224 415/122.1 |
| 7,641,042 | B2 * | 1/2010 | Andrews | A46B 13/006 15/256.5 |
| 7,703,577 | B1 | 4/2010 | Zach et al. | |
| 8,047,332 | B2 * | 11/2011 | Salmela | F16H 57/0431 184/13.1 |
| 8,196,489 | B2 * | 6/2012 | Paluncic | F04C 2/084 74/468 |
| 8,659,180 | B2 * | 2/2014 | Earl | E02B 9/08 290/54 |
| 9,033,109 | B2 * | 5/2015 | Segovia | F16H 57/0431 184/14 |
| 9,441,613 | B2 * | 9/2016 | Orlitzky | F16N 11/08 |
| 9,528,500 | B2 * | 12/2016 | Xu | F03D 80/70 |
| 2003/0045835 | A1 * | 3/2003 | Anderson | A61B 17/12022 604/164.01 |
| 2004/0238282 | A1 * | 12/2004 | Mitrovich | B61K 3/02 184/3.2 |
| 2008/0008358 | A1 | 1/2008 | Miura et al. | |
| 2008/0276743 | A1 * | 11/2008 | Salmela | F16H 57/0431 74/467 |
| 2010/0000358 | A1 | 1/2010 | Paluncic et al. | |
| 2013/0192930 | A1 * | 8/2013 | Segovia | F16H 57/0431 184/14 |
| 2014/0060973 | A1 | 3/2014 | Singer | |
| 2014/0209413 | A1 * | 7/2014 | Orlitzky | F16N 11/08 184/4 |
| 2014/0286775 | A1 | 9/2014 | Pasquet et al. | |
| 2015/0011475 | A1 | 1/2015 | Mashima et al. | |
| 2015/0114401 | A1 * | 4/2015 | Van Der Vleuten | A61F 6/005 128/831 |
| 2015/0114756 | A1 | 4/2015 | Xu et al. | |
| 2015/0218980 | A1 * | 8/2015 | Bonde | F16K 15/044 184/6.5 |
| 2015/0377412 | A1 | 12/2015 | Dann | |
| 2018/0163849 | A1 | 6/2018 | Schoenfeld et al. | |
| 2018/0163921 | A1 | 6/2018 | Schoenfeld et al. | |

FOREIGN PATENT DOCUMENTS

| | | |
|---|---|---|
| CN | 203809218 U | 9/2014 |
| CN | 203857241 U | 10/2014 |
| DE | 127889 A | 2/1900 |
| DE | 328064 A | 10/1920 |
| DE | 29807000 U1 | 7/1998 |
| DE | 202005014699 U1 | 12/2005 |
| DE | 102007049674 A1 | 4/2009 |
| DE | 102010045653 A1 | 3/2012 |
| DE | 102011080734 A1 | 2/2013 |
| DE | 102013210109 A1 | 12/2014 |
| DE | 202015100703 U1 | 5/2016 |
| DE | 102015223543 A1 | 6/2017 |
| KR | 1020140129633 A | 11/2014 |
| WO | 2015045908 A1 | 4/2015 |

* cited by examiner

LUBRICANT APPLICATOR

CROSS-REFERENCE

This application claims priority to German patent application no. 10 2016 224 679.8 filed on Dec. 12, 2016, the contents of which are fully incorporated herein by reference.

TECHNOLOGICAL FIELD

The present disclosure is directed to a lubricant applicator, and, more specifically, to a lubricant applicator that is at least partly configured as a coiled wire.

BACKGROUND

A wind turbine is known that has a plurality of rotor blades. The rotor blades are rotatable about their longitudinal directions (axes) so that the wind turbine can be taken out of the wind. The drives for rotating the rotor blades in this manner are called pitch drives. During the rotation, tooth flanks of gears, which tooth flanks are meshed, must be continuously supplied with lubricant in order to protect against increased wear between the two tooth flanks in the long term. The lubricant is currently applied to the respective tooth flanks of the pitch drive using a lubrication pinion laterally attached to the pitch drive. In order to be able to apply the lubricant to the tooth flanks using the lubrication pinion, the pitch drive or the rotor blade must be rotated in a maintenance interval until the meshed tooth flank comes into contact with the lubrication pinion. Due to these maintenance- or service-intervals undesired downtimes arise, since the system must be taken out of the wind and thus can generate no current. A direct lubrication of the tooth flanks using lubrication pinions during the operation of a wind turbine is currently not possible.

SUMMARY

An aspect of the present disclosure comprises achieving a high efficiency.

A lubricant applicator is disclosed that includes at least one region which is configured wire-shaped. A high efficiency can thereby be achieved. In particular, it makes it possible for a gear to be lubricated during operation, and specifically for the lubricant applicator to project into a base of an intermediate space between two teeth, wherein a tooth of another gear can engage here in the intermediate space.

Furthermore, a gear lubricant line device including the lubricant applicator is disclosed, wherein the gear lubricant line device includes at least one attachment unit that makes possible a materially-bonded and/or magnetic attachment of the gear lubricant line device.

A "gear lubricant line device" shall be understood in particular to mean a lubricant line device that is attachable to an end side of a gear and/or an end side of an open ring gear, wherein the lubricant line device is preferably attached during operating states to the end side of the gear or the end side of the open ring gear.

According to another aspect of the disclosure, a lubricant application device comprises a base body configured to be mounted to an end surface of a gear, the base body including a port configured to be connected to a source of lubricant. The device also includes a holder for holding a lubricant applicator supported which holder is supported by the base body, a lubricant passage connecting the port to the holder, and a lubricant applicator in the holder. The lubricant applicator comprising a coiled wire defining an internal passage for carrying the lubricant. The coiled wire may have a first length of coils that are not axially separated by spaces and a second length of coils that are axially separated by spaces.

Further advantages arise from the following description of the drawings. An exemplary embodiment of the disclosure is depicted in the drawings. The drawings, the description, and the claims contain numerous features in combination. The person skilled in the art will also advantageously consider the features individually and in further meaningful combinations.

DETAILED DESCRIPTION

Figure 1:
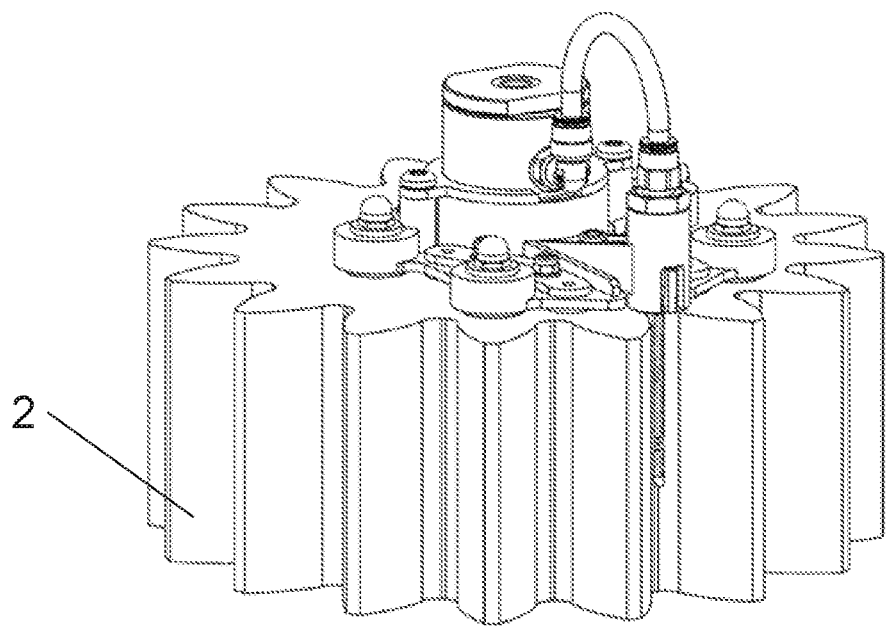
FIG. 1 is a perspective view of an assembly including a gear and a gear lubricant line device according to the present disclosure that includes a lubricant applicator.
Figure 2:
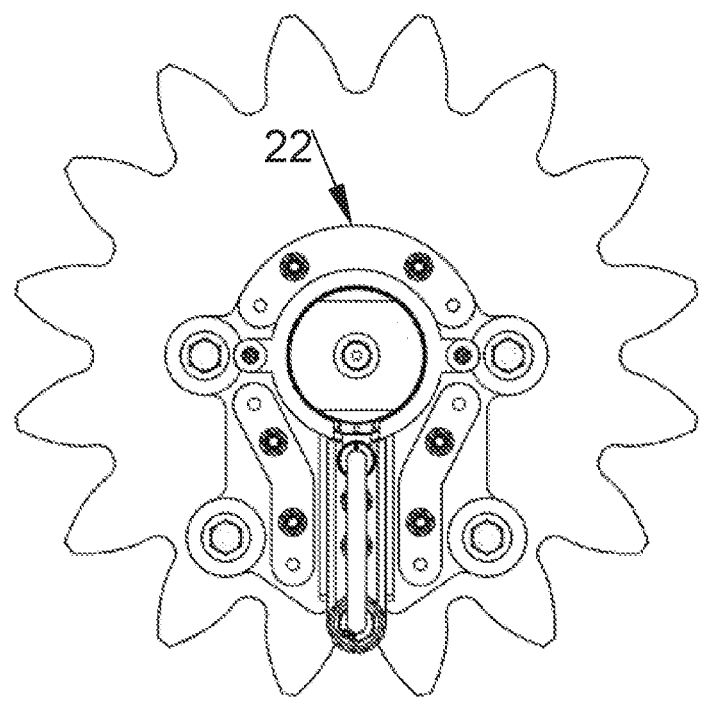
FIG. 2 is a top plan view of the assembly of FIG. 1 from above.
Figure 5:
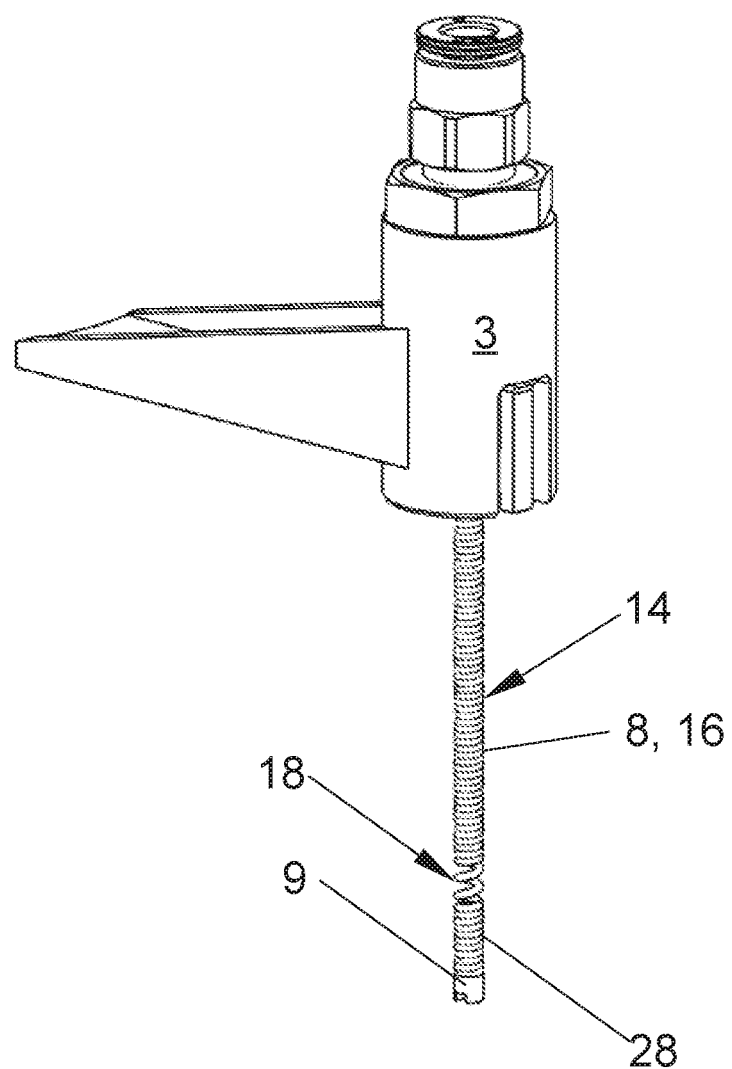
FIG. 5 is a perspective view of the mount and the lubricant applicator of the assembly of FIG. 1 removed from the gear lubricant line device.

FIG. 1 shows a perspective view of an assembly including a gear 2 and a gear lubricant line device 22 according to the present disclosure that includes a lubricant applicator 14 according to the disclosure. The lubricant applicator 14 includes a region 8 (FIG. 5) that is formed of wire. The region 8 forms a spring and comprises a partial region 16, which is configured wire-shaped and which forms a channel for guiding a liquid. In the partial region 16 the wire is helically wound, wherein respectively adjacent windings abut against one another. The lubricant applicator 14 is inserted by a first end into a mount 3 of the gear lubricant line device 22. The region 8 includes a further partial region 28, which also forms a channel. A second end of the lubricant applicator 14 includes a plug 9, using which the partial region 28 of the region 8 is sealed. In an alternative embodiment the lubricant applicator does not include the plug 9, with the result that the partial region 28 and thus the second end is unsealed.

In addition, a further partial region 18 of the region 8 is disposed between the partial regions 28 and 16, wherein two windings of the wire are disposed spaced from each other with respect to an axial direction of the lubricant applicator 14. Lubricant that is conducted in an operating process through the channel of the partial region 16 can emerge from the channel between the windings in the partial region 18, and specifically such that the lubricant also does not enter into the channel of the partial region 28.

Figure 4:
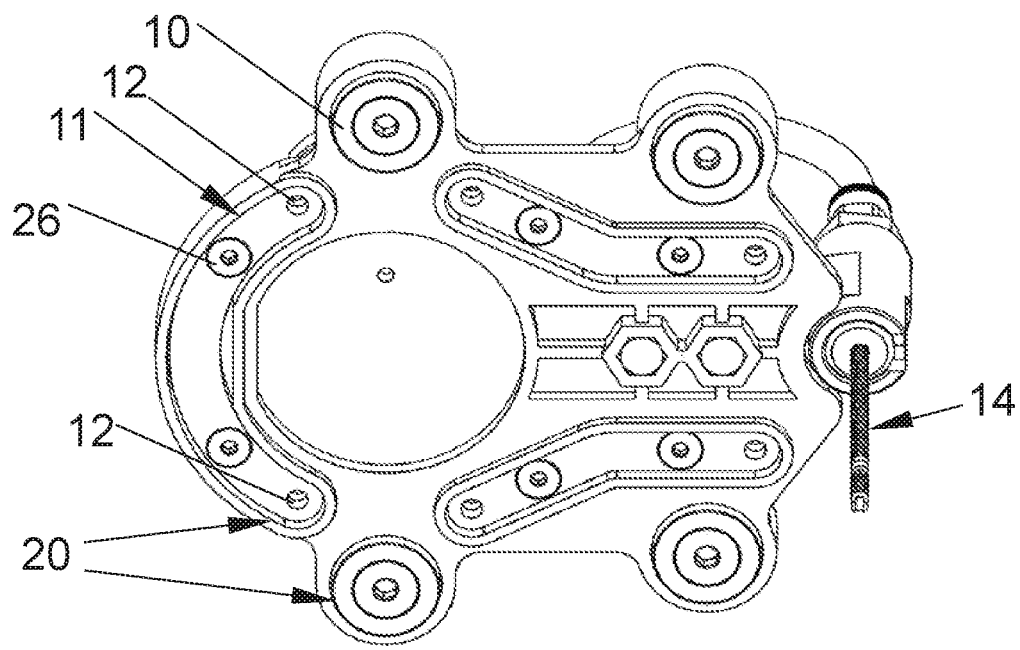
FIG. 4 is a bottom perspective view of the gear lubricant line device of FIG. 1.

The gear lubricant line device 22 includes an attachment unit 20, using which the gear lubricant line device 22 is attached in a materially-bonded manner and magnetically to an end side of the gear 2 (FIG. 4). The attachment element 20 includes a receiving region 11 in which adhesive is applied that fixedly adheres the gear lubricant line device 22 to the end side of the gear. Furthermore, two further receiving regions are disposed on an underside of the gear lubricant line device 22, in which receiving regions adhesive is also applied, which also effects a fixed adhesion of the gear lubricant line device 22 to the end side of the gear. The receiving regions are formed on a base body 6 of the gear lubricant line device 22. The base body 6 includes two through-holes 12 that both open into the receiving region 11. When the gear lubricant line device is attached to the end side of the gear, the gear lubricant line device 22 is initially attached to the end side by four permanent magnets 10. Adhesive is subsequently applied via one of the through-holes, which adhesive then flows-in into the receiving region 11. Air, which is displaced by the flowing-in of adhesive from the receiving region 11, flows through the other through-hole 12 into a space outside the receiving region 11. A surface region 26 of the receiving region 11 is made of metal, with the result that in particular metal of the surface region 26 is adhered by the adhesive to a metallic surface of the end side of the gear.

If the assembly is installed in a wind turbine, then rotations of a rotor blade of the wind turbine about a longitudinal direction (axis) of the rotor blade are brought about by the gear. These rotations are effected by approximately 1° to 2°. For this reason a lubricating of a tooth intermediate space is usually sufficient.

Furthermore, the gear lubricant line device 22 includes a terminal 24 to which in an operating state a lubricant line is connected (FIG. 1). The terminal 24 is supported rotatably relative to the base body 6 and thus rotatably relative to the gear 2. This supporting is effected by two ball bearings. In an operating process a hose 30 forwards lubricant that has flowed in through the terminal 24 to the mount 3.

Figure 3:
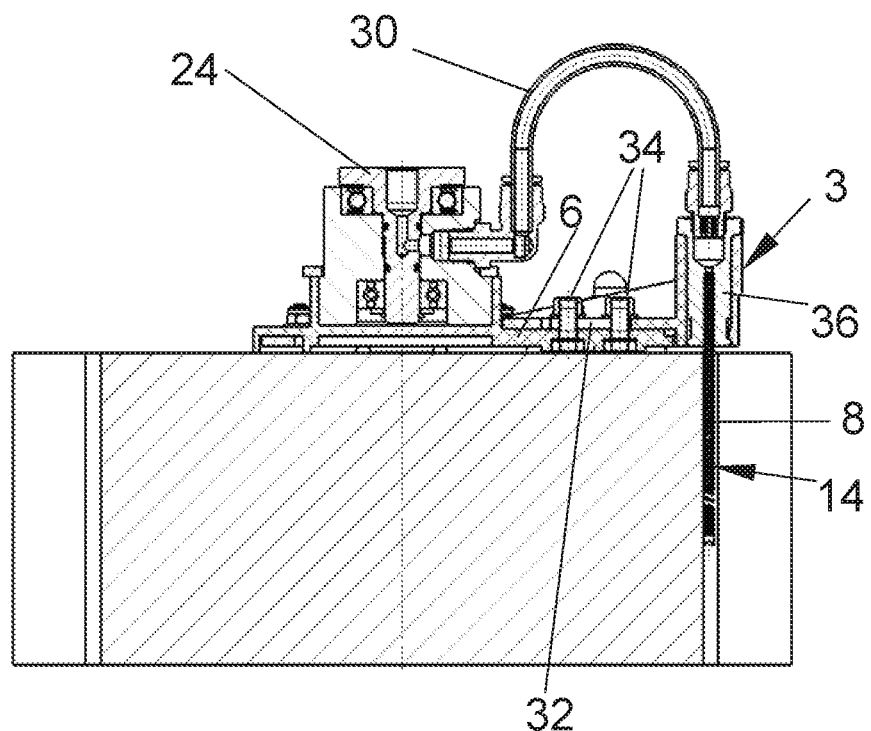
FIG. 3 is a sectional elevational view through the assembly of FIG. 1 in a radial direction of the gear.

The mount 3 holds the lubricant applicator 14 and is supported in a translationally movable manner relative to the base body 6 (FIG. 3). For this purpose the mount 3 includes a slot 32, through which two screws 34 project that fixedly screw the mount to the base body 6. A rectilinear movement of the mount 3 relative to the base body 6 is now achieved by loosening the screws 34 and manually carrying out the movement and subsequently tightening the screws 34 again, so that the mount 3 is fixedly screwed to the base body again. The lubricant applicator can thereby be precisely positioned in a base of a tooth intermediate space of the gear. If the applicator is nevertheless contacted by an object, in particular in an operating process, this is harmless for its functioning, since the applicator is formed in large part of wire and is thus flexible. The tooth flanks that delimit the tooth intermediate space are reliably supplied with lubricant by an operation of the lubricant applicator.

The mount 3 includes a receptacle 36, wherein the lubricant applicator is partially received. The receptacle 36 is removable from the mount and replaceable by another receptacle that is suited for attaching a lubricant applicator of a different type. Thus for any geometric configuration of a tooth intermediate space a matching lubricant applicator can be installed into the receptacle and thus into the mount 3 by the exchange of the receptacle.

Service intervals can be minimized or simplified by the gear lubricant line device. Downtimes of wind turbines are reduced. A simple installation is also possible in the retrofitting of existing wind turbines.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubricant applicator.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

2 Gear
3 Mount
6 Base body
8 Region
9 Plug
10 Permanent magnet
11 Receiving region
14 Lubricant applicator
16 Partial region
18 Partial region
20 Attachment unit
22 Gear lubricant line device
24 Terminal
26 Surface region
28 Partial region
30 Hose
32 Slot
34 Screw
36 Receptacle

What is claimed is:

1. A lubricant applicator including at least one region comprising a coiled wire having a plurality of coils, the coiled wire having a first region in which the coils are in mutual contact and a second region in which the coils are in mutual contact and a third region between the first region and the second region in which the coils are spaced from each other.

2. The lubricant applicator according to claim 1, wherein the region forms a channel for guiding a liquid.

3. The lubricant applicator according to claim 2, including a plug that seals an end of the channel.

4. The lubricant applicator according to claim 1, wherein the coiled wire comprises a spring.

5. A gear lubricant line device comprising:
a lubricant applicator including at least one region comprising a coiled wire, and
an attachment unit configured attach the lubricant applicator to a gear in a materially-bonded and/or magnetic manner.

6. An assembly comprising:
a gear configured to bring about a rotating of a rotor blade of a wind turbine about its longitudinal direction, and
a gear lubricant line device according to claim 5,
wherein the gear lubricant line device is attached to an end side of the gear.

7. A wind turbine or open gear transmission including an assembly according to claim 6.

8. The gear lubricant line device according to claim 5, wherein the coiled wire comprises a spring.

9. The gear lubricant line device according to claim 5, wherein the coiled wire has a plurality of coils, and a first region in which the coils are in mutual contact and a second region in which the coils are in mutual contact and a third region between the first region and the second region in which the coils are spaced from each other.

10. A lubricant application device comprising:
a base body configured to be mounted to an end surface of a gear, the base body including a port configured to be connected to a source of lubricant,
a holder for holding a lubricant applicator supported by the base body,
a lubricant passage connecting the port to the holder, and
a lubricant applicator in the holder, the lubricant applicator comprising a coiled wire defining an internal passage for carrying the lubricant.

11. The lubricant application device according to claim 10, wherein the lubricant passage and the coiled wire are substantially filled with the lubricant.

12. The lubricant application device according to claim 10,
wherein the coiled wire comprises a plurality of interconnected coils,
wherein no axial spaces exist between the coils of a first length of the coiled wire, and
wherein axial spaces exist between the coils of a second length of the coiled wire.

13. The lubricant application device according to claim 10,
wherein the second length of the coiled wire is located downstream from the first length of coiled wire relative to a direction of lubricant flow.

14. The lubricant application device according to claim 10,
wherein the coiled wire comprises a plurality of interconnected coils,
wherein no axial spaces exist between the coils of a first length of the coiled wire, and
wherein no axial spaces exist between the coils of a second length of the coiled wire, and
wherein axial spaces exist between the coils of a third length of the coiled wire, the third length being located axially between the first length and the second length.

15. The lubricant application device according to claim 14, including a plug at an end of the second length of the coiled wire.

16. The lubricant application device according to claim 15, wherein the lubricant passage and the first length of the coiled wire are substantially filled with the lubricant.

17. The lubricant application device according to claim 15, wherein the coiled wire comprises a spring.

18. A lubricant application device comprising:
a base body configured to be mounted to an end surface of a gear, the base body including a port configured to be connected to a source of lubricant, and
the lubricant applicator according to claim 1.

19. The lubricant application device according to claim 18, wherein the coiled wire comprises a spring.

* * * * *